United States Patent
Haas et al.

(10) Patent No.: US 11,177,483 B2
(45) Date of Patent: Nov. 16, 2021

(54) ELECTROCATALYST COMPOSITION COMPRISING NOBLE METAL OXIDE SUPPORTED ON TIN OXIDE

(71) Applicant: BASF SE, Ludwigshafen am Rhein (DE)

(72) Inventors: Andreas Haas, Ludwigshafen am Rhein (DE); Domnik Bayer, Ludwigshafen am Rhein (DE); Rosalba Adriana Rincon-Ovalles, Mannheim (DE); Markus Kohl, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/343,916

(22) PCT Filed: Oct. 24, 2017

(86) PCT No.: PCT/EP2017/077130
§ 371 (c)(1),
(2) Date: Apr. 22, 2019

(87) PCT Pub. No.: WO2018/077857
PCT Pub. Date: May 3, 2018

(65) Prior Publication Data
US 2019/0379058 A1    Dec. 12, 2019

(30) Foreign Application Priority Data

Oct. 28, 2016 (EP) .................................... 16196291

(51) Int. Cl.
| | | |
|---|---|---|
| *H01M 4/90* | (2006.01) | |
| *H01M 4/92* | (2006.01) | |
| *C25B 11/093* | (2021.01) | |
| *C25B 11/097* | (2021.01) | |

(52) U.S. Cl.
CPC ......... *H01M 4/9033* (2013.01); *C25B 11/093* (2021.01); *C25B 11/097* (2021.01); *H01M 4/923* (2013.01); *H01M 4/925* (2013.01)

(58) Field of Classification Search
CPC . B01J 35/1014; B01J 23/626; C25B 11/0484; C25B 11/0494; C25B 11/093; C25B 11/097
See application file for complete search history.

(56) References Cited

U.S. PATENT DOCUMENTS

| | | | |
|---|---|---|---|
| 4,513,102 A | * | 4/1985 | Hutchings ................. C25C 7/02 502/101 |
| 2014/0224666 A1 | | 8/2014 | Kintrup et al. |
| 2014/0322631 A1 | | 10/2014 | Klose-Schubert et al. |
| 2018/0006313 A1 | | 1/2018 | Haas |
| 2019/0006638 A1 | | 1/2019 | O'Donnell |
| 2019/0060874 A1 | | 2/2019 | Peng et al. |
| 2019/0089014 A1 | | 3/2019 | Heidebrecht et al. |

FOREIGN PATENT DOCUMENTS

| | | |
|---|---|---|
| EP | 2608297 A1 | 6/2013 |
| WO | WO-2017093386 A1 | 6/2017 |
| WO | WO-2018073292 A1 | 4/2018 |
| WO | WO-2018073367 A1 | 4/2018 |
| WO | WO-2018077857 A1 | 5/2018 |

OTHER PUBLICATIONS

U.S. Appl. No. 16/343,282, filed Apr. 18, 2019.
International Search Report for PCT/EP2017/077130 dated Jan. 10, 2018.
Karimi, F., et al., "Study of the Effect of Calcination Temperature on the Morphology and Activity of Iridium Oxide Electrocatalyst Supported on Antimony Tin Oxide (ATO) for PEM Electrolyser Technology", ECS Transactions, vol. 69, No. 16, (2015), pp. 87-98.
Marshall, A., et al., "Electrocatalytic activity of $IrO_2$-$RuO_2$ supported on Sb-doped $SnO_2$ nanoparticles", Electrochimica Acta, vol. 55, No. 6, (2010), pp. 1978-1984.
Puthiyapura, V.K., et al., "Physical and electrochemical evaluation of ATO supported $IrO_2$ catalyst for proton exchange membrane water electrolyser", Journal of Power Sources, vol. 269, (2014), pp. 451-460.
Written Opinion of the International Searching Authority for PCT/EP2017/077130 dated Jan. 10, 2018.
U.S. Appl. No. 16/061,882, filed Apr. 18, 2019.

* cited by examiner

*Primary Examiner* — Ladan Mohaddes
(74) *Attorney, Agent, or Firm* — Faegre Drinker Biddle & Reath LLP

(57) ABSTRACT

The present invention relates to a catalyst composition, comprising tin oxide particles which are at least partially coated by a noble metal oxide layer, wherein the composition contains iridium and ruthenium in a total amount of from 10 wt % to 38 wt %, and all iridium and ruthenium is oxidized, —has a BET surface area of from 5 to 95 $m^2/g$, and —has an electrical conductivity at 25° C. of at least 7 S/cm.

21 Claims, 1 Drawing Sheet

ELECTROCATALYST COMPOSITION COMPRISING NOBLE METAL OXIDE SUPPORTED ON TIN OXIDE

CROSS-REFERENCE TO RELATED APPLICATIONS

This application is a national stage application (under 35 U.S.C. § 371) of PCT/EP2017/077130, filed Oct. 24, 2017, which claims benefit of European Application No. 16196291.5, filed Oct. 28, 2016, both of which are incorporated herein by reference in their entirety.

The present invention relates to a catalyst composition comprising tin oxide particles which are at least partially coated by a noble metal oxide layer, and using said composition as an electrocatalyst (e.g. in a water electrolyser or a fuel cell).

Hydrogen is a promising clean energy carrier that can be produced by various technologies. At present, hydrogen is mainly produced by steam reforming of natural gas. However, steam reforming of fossil fuels produces low purity hydrogen.

High-quality hydrogen can be produced by water electrolysis. As known to the skilled person, a water electrolyser (i.e. a device in which the water electrolysis is carried out) contains at least one anode-containing half cell where the oxygen evolution reaction (OER) takes place, and at least one cathode-containing half cell where the hydrogen evolution reaction (HER) takes place. If two or more cells are linked together, a stacked configuration is obtained. Accordingly, a water electrolyser having a stacked configuration contains at least two anode-containing half cells and/or at least two cathode-containing half cells.

Different types of water electrolysers are known.

In an alkaline water electrolyser, the electrodes are immersed in a liquid alkaline electrolyte (e.g. an aqueous 20-30% KOH solution). The two electrodes are separated by a diaphragm, which keeps the product gases apart from each other but is permeable to the hydroxide ions and water molecules. The following reaction scheme shows the oxygen evolution reaction which takes place at the surface of the anode in the anode-containing half cell of the alkaline water electrolyser:

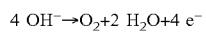

In a polymer electrolyte membrane (PEM) water electrolyser (also referred to as a "proton exchange membrane" (PEM) water electrolyser), a solid polymer electrolyte is used which is responsible for proton transport from the anode to the cathode while electrically insulating the electrodes from each other, and for separating the product gases. The following reaction scheme shows the oxygen evolution reaction which takes place at the surface of the anode in the anode-containing half cell of the PEM water electrolyser:

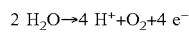

Due to its complexity, the oxygen evolution reaction has slow kinetics, which is why a significant overpotential is needed at the anode side for producing oxygen at reasonable rates. Typically, PEM water electrolysers are operated at a voltage of about 1.5 to 2 V (vs. RHE ("reversible hydrogen electrode")).

As the pH is very acidic (PEM: pH of less than 2) and a high overpotential has to be applied, the materials which are present in the anode side of a PEM water electrolyser need to be very corrosion resistant.

Typically, the anode of a water electrolyser comprises a catalyst for the oxygen evolution reaction (an OER electrocatalyst). Appropriate OER electrocatalysts are known to the skilled person and have been described e.g. by M. Carmo et al., "A comprehensive review on PEM water electrolysis", International Journal of Hydrogen Energy, Vol. 38, 2013, pp. 4901-4934; and H. Dau et al., "The Mechanism of Water Oxidation: From Electrolysis via Homogeneous to Biological Catalysis", ChemCatChem, 2010, 2, pp. 724-761.

S. P. Jiang and Y. Cheng, Progress in Natural Science: Materials International, 25 (2015), pp. 545-553, provide a review on electrocatalysts for the oxygen evolution reaction in water electrolysis.

It is known that iridium or ruthenium or oxides thereof are efficient catalysts for the oxygen evolution reaction. As iridium and ruthenium are expensive, it is desirable to have a sufficiently high catalytic activity even a low amounts of iridium and/or ruthenium, and a very low dissolution of these metals into the surrounding electrolyte under the highly corrosive operating conditions of PEM water electrolysers and fuel cells.

Bulk catalysts have a limited surface area for electrochemical activity. For increasing the catalytically active surface area, it is generally known to apply a catalyst on a support.

P. Strasser et al., Chem. Sci., 2015, 6, pp. 3321-3328, describe the preparation of metallic iridium nanodendrites which are then deposited on an antimony-doped tin oxide (typically referred to as "ATO") having a BET surface area of 263 m$^2$/g. Before being tested as a catalyst in an oxygen evolution reaction, the surface of the metallic iridium nanodendrites is electrochemically oxidized in an acidic medium. However, by subjecting metallic iridium to an electrochemical oxidation under acidic conditions, some iridium may dissolve into the surrounding electrolyte. A similar approach is described by P. Strasser et al. in Angew. Chem., Int. Ed., 2015, 54, pp. 2975-2979. Oxide-supported IrNiOx core-shell particles are prepared from bimetallic IrNi$_x$ precursor alloys using electrochemical Ni leaching and electrochemical oxidation of metallic iridium. As discussed by P. Strasser et al. in J. Am. Chem. Soc., 2016, 138 (38), pp 12552-12563, electrochemical oxidation of metallic iridium nanoparticles generates iridium oxide on the particle surface while the core still contains metallic iridium (i.e. iridium in oxidation state 0).

V. K. Puthiyapura et al., Journal of Power Sources, 269 (2014), pp. 451-460, describe the preparation of an ATO-supported IrO$_2$ catalyst via a so-called Adams fusion method, wherein H$_2$IrCl$_6$ and NaNO$_3$ are added to an aqueous dispersion of antimony-doped tin oxide (ATO) particles. The solvent is evaporated and the obtained mixture is dried and calcined at 500° C. By this Adams fusion method, a composition of relatively low electrical conductivity is obtained, as shown by FIG. 6 of said publication. Emma Oakton et al., New J. Chem., 2016, 40, pp. 1834-1838, describe the preparation of a high surface area iridium oxide/titanium oxide composition via the Adams fusion method by dissolving a Ti salt, an Ir salt and NaNO$_3$ in water, evoparating the water, drying the mixture, followed by calcination at 350° C. A composition of relatively low electrical conductivity is obtained, as shown by FIG. 4 of said publication.

EP 2 608 297 A1 describes a catalyst composition for water electrolysis, comprising iridium oxide and a high surface area inorganic oxide, having a BET surface area in the range of 30 to 200 m$^2$/g, wherein the inorganic oxide is present in an amount of from 25 to 70 wt % based on the total weight of the catalyst and wherein the electrical conductivity of the catalyst is >0.01 S/cm.

The object of the present invention is to provide a composition which is an effective electrocatalyst, in particular for the oxygen evolution reaction, shows high stability under very corrosive conditions (e.g. in PEM water electrolysers or PEM fuel cells), and is viable from an economical point of view.

The object is solved by a catalyst composition, comprising tin oxide particles, wherein the tin oxide is optionally doped with at least one metal dopant, the tin oxide particles being at least partially coated by a noble metal oxide layer, wherein the noble metal oxide is an iridium oxide or an iridium-ruthenium oxide, wherein the composition contains iridium and ruthenium in a total amount of from 10 wt % to 38 wt %, and all iridium and ruthenium is oxidized, has a BET surface area of from 5 to 95 $m^2/g$, and has an electrical conductivity at 25° C. of at least 7 S/cm.

Figures 1A, 1B:
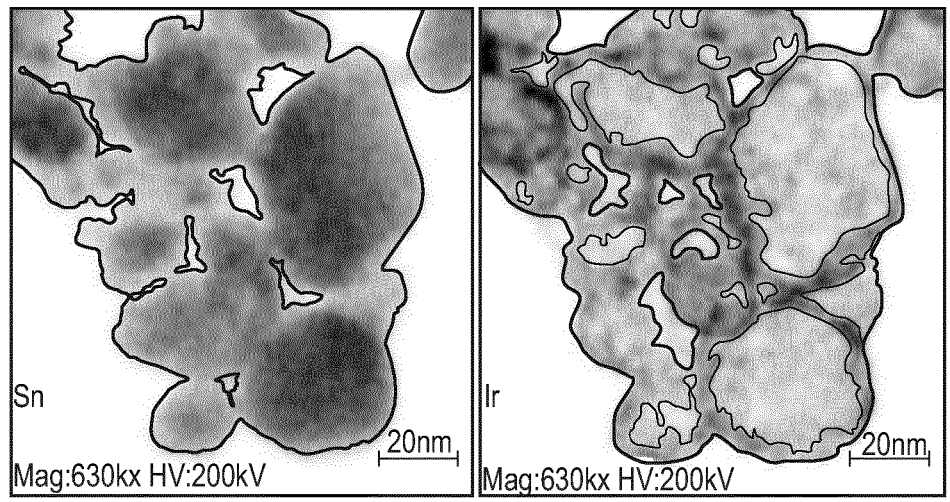
FIGS. 1a and 1b show scanning transmission electron microscopy photographs with EDXS mapping.

A composition which complies with these features shows a surprisingly high catalytic activity towards an oxygen evolution reaction, and is very stable under highly corrosive conditions. Furthermore, as the total amount of iridium and, if present, ruthenium is kept on a relatively low level, a very cost-efficient catalyst composition is obtained.

The tin oxide particles act as a carrier for the noble metal oxide. The particles can be made of non-doped tin oxide (i.e. the particles may consist of tin oxide and unavoidable impurities). Alternatively, for improving electrical conductivity of the carrier particles, the tin oxide can be doped with at least one metal dopant. Appropriate metal dopants are e.g. Sb, Nb, Ta, Bi, W, or In, or any combination of at least two of these dopants. The one or more metal dopants are preferably present in the tin oxide particles in an amount of from 2.5 at % to 20 at %, based on the total amount of tin and metal dopant atoms. Dissolution of the metal dopant into a surrounding corrosive medium can be improved if the amount of the one or more metal dopants is limited to a range of from 2.5 at % to 10.0 at %, even more preferably 5.0 at % to 9.0 at % based on the total amount of tin and metal dopant atoms.

In a preferred embodiment, the tin oxide is doped with Sb as the only metal dopant. Accordingly, in this preferred embodiment, the tin oxide particles consist of Sb-doped tin oxide (i.e. "ATO") and unavoidable impurities. Sb as the only metal dopant is preferably present in an amount as already specified above. Typically, Sb is in a mixed valence state containing Sb atoms of oxidation state +V and Sb atoms of oxidation state +III. The atomic ratio of the Sb atoms of oxidation state +V to the Sb atoms of oxidation state +III is preferably in the range of from 3.0 and 9.0, more preferably from 4.0 to 8.0.

As will be discussed below in further detail, the noble metal oxide is applied onto the tin oxide particles via pH-initiated precipitation of noble metal species, followed by thermal treatment at high temperature. By this method, a catalyst composition is typically obtained which has a BET surface area being lower than the BET surface area of the non-coated tin oxide starting material. Accordingly, for providing a catalyst composition having a BET surface area of from 5 to 95 $m^2/g$, a tin oxide (either doped or non-doped) having a slightly higher BET surface area is typically subjected to the noble metal oxide deposition treatment. The tin oxide starting material can have a BET surface area of e.g. from 10 $m^2/g$ to 100 $m^2/g$.

As indicated above, each of the tin oxide particles is at least partially coated by a noble metal oxide layer, wherein the noble metal oxide is an iridium oxide or an iridium-ruthenium oxide.

The formation of a noble metal oxide layer on the tin oxide particles even at relatively low amounts of noble metal (instead of forming isolated oxide particles being distributed over the support surface) results from applying the preparation method as described below (i.e. pH-induced precipitation from an aqueous medium, followed by calcination at high temperature). The presence of a noble metal oxide coating layer on a tin oxide particle assists in improving electrical conductivity of the catalyst composition, which in turn improves electron transfer efficiency during the catalytic reaction. For obtaining an electrical conductivity of at least 7 S/cm, a noble metal oxide layer which is partially coating the carrier particle can be sufficient. However, in the present invention, it is also possible that the tin oxide particles are completely coated by the noble metal oxide layer.

Particles which are at least partially coated by a layer are known as core-shell particles. Accordingly, the tin oxide particles of the present invention which are at least partially coated by a noble metal oxide (shell) layer can be referred to as core-shell particles.

As indicated above, the catalyst composition contains iridium and ruthenium in a total amount of from 10 wt % to 38 wt %, all iridium and ruthenium being oxidized. Oxidized iridium means iridium in an oxidation state >0. The same applies to oxidized ruthenium. Accordingly, the catalyst composition is free of iridium and ruthenium in oxidation state 0 (i.e. free of metallic iridium and ruthenium). The oxidation state of iridium and ruthenium can be verified by X-ray photoelectron spectroscopy (XPS).

Preferably, the total amount of iridium and ruthenium in the composition is within the range of from 15 to 35 wt %, more preferably from 20 to 28 wt %.

Of course, if the noble metal oxide is iridium oxide and the catalyst composition is free of ruthenium, the ranges outlined above just apply to the total iridium content.

In the preparation method of the present invention, an Ir(III) and/or Ir(IV) salt (and/or a Ru(III) and/or Ru(IV) salt) is used as a starting material, no conditions are typically applied during the preparation which may reduce these salts to metallic iridium or ruthenium, and a final calcination step in air (or a similar oxidizing atmosphere) is typically applied. By this preparation method, all iridium and ruthenium being present in the catalyst composition is oxidized iridium and ruthenium.

As no metallic iridium and ruthenium are present in the final catalyst or somehow involved in the preparation process, dissolution of metallic iridium or ruthenium into the surrounding electrolyte under highly corrosive conditions is avoided.

Preferably, all iridium and ruthenium being present in the catalyst composition is in oxidation state +III and/or +IV.

Preferably, at least 80 at %, more preferably at least 90 at %, even more preferably at least 95 at % of the oxidized iridium and ruthenium is in oxidation state +IV. In a preferred embodiment, all iridium and ruthenium which is present in the catalyst composition is in oxidation state +IV.

If the catalyst composition contains both iridium and ruthenium, the atomic ratio may vary over a broad range. Typically, the atomic ratio between iridium and ruthenium is within the range of from 70/30 to 99/1, more preferably from 80/20 to 97/3.

However, it is also possible that the catalyst composition is free of ruthenium.

The catalyst composition may contain the tin oxide particles (the tin oxide optionally being doped with one or more metal dopants as specified above) in an amount of from e.g. 57 wt % to 88 wt %, more preferably from 59 wt % to 82 wt %, or from 67 wt % to 76 wt %.

Preferably, the catalyst composition contains iridium and ruthenium in the total amounts as specified above, the remainder being the tin oxide particles and the oxygen of the iridium and/or ruthenium oxide layer.

Preferably, all iridium and ruthenium of the composition is present in the oxide layer which is at least partially covering the tin oxide particles.

As indicated above, the catalyst composition of the present invention has a BET surface area of from 5 to 95 $m^2/g$. By keeping BET surface area on a moderate level, the tin oxide particles are efficiently covered by a noble metal oxide layer even at relatively low amounts of noble metal.

Preferably, the BET surface area of the composition is from 5 $m^2/g$ to 90 $m^2/g$, more preferably from 10 $m^2/g$ to 80 $m^2/g$. Even if the BET surface area of the composition is within the range of from 5 $m^2/g$ to 60 $m^2/g$, or from 5 $m^2/g$ to 50 $m^2/g$, the catalyst composition still shows a surprisingly high catalytic activity. In another preferred embodiment, the BET surface area of the composition is from 5 $m^2/g$ to 35 $m^2/g$, in particular if the tin oxide is non-doped.

As indicated above, the catalyst composition has an electrical conductivity at 25° C. of at least 7 S/cm. High electrical conductivity promotes electron transfer to the reactants during the catalytic reaction.

Preferably, the electrical conductivity of the composition is at least 10 S/cm, more preferably at least 12 S/cm. Appropriate ranges are e.g. from 7 to 60 S/cm, more preferably from 10 to 50 S/cm, or from 12 to 40 S/cm.

Preferably, the ratio of the BET surface area (in $m^2/g$) of the composition to the total amount (in wt %) of iridium and ruthenium in the composition is within the range of from 6.0 to 0.75, more preferably 4.0 to 1.0.

In a preferred embodiment, the tin oxide is doped with antimony in an amount of from 2.5 at % to 20 at %, more preferably from 2.5 at % to 10.0 at %; the amount of iridium in the composition is within the range of from 15 to 35 wt %, more preferably from 20 to 28 wt %, the remainder being the tin oxide particles and the oxygen of the iridium oxide layer; the BET surface area of the composition is from 15 $m^2/g$ to 90 $m^2/g$, more preferably from 30 $m^2/g$ to 80 $m^2/g$; and the electrical conductivity of the composition is at least 10 S/cm, more preferably at least 12 S/cm (e.g. 10 to 50 S/cm, or 12 to 40 S/cm).

In another preferred embodiment, the tin oxide is a non-doped tin oxide; the amount of iridium in the composition is within the range of from 15 to 35 wt %, more preferably from 20 to 28 wt %, the remainder being the tin oxide particles and the oxygen of the iridium oxide layer; the BET surface area of the composition is from 5 $m^2/g$ to 35 $m^2/g$; and the electrical conductivity of the composition is at least 10 S/cm, more preferably at least 12 S/cm (e.g. 10 to 50 S/cm, or 12 to 40 S/cm).

Furthermore, the present invention relates to a process for preparing the catalyst composition as described above, which comprises dispersing tin oxide particles and dissolving a noble-metal-containing precursor compound in an aqueous medium, wherein the noble metal is iridium or ruthenium or a mixture thereof, adjusting pH of the aqueous medium to 5-10 and optionally heating the aqueous medium to a temperature of from 50° C. to 95° C., thereby depositing noble metal species on the tin oxide particles, separating the tin oxide particles that are coated with Ir compounds from the aqueous medium and subjecting the tin oxide particles to a thermal treatment at a temperature of from 300° C. to 800° C., thereby forming the noble metal oxide layer on the tin oxide particles.

With regard to preferred properties of the (doped or non-doped) tin oxide particles, reference can be made to the statements provided above.

The noble metal oxide is applied onto the tin oxide particles via pH-initiated precipitation of noble metal species, followed by thermal treatment at high temperature. By this method, a catalyst composition is typically obtained which has a BET surface area being lower than the BET surface area of the non-coated tin oxide starting material. Accordingly, for providing a catalyst composition having a BET surface area of from 5 to 95 $m^2/g$, a tin oxide (either doped or non-doped) having a slightly higher BET surface area is typically subjected to the noble metal oxide deposition treatment. The tin oxide particles to be coated with the noble metal oxide can have a BET surface area of e.g. from 10 $m^2/g$ to 100 $m^2/g$.

As known to the skilled person, noble-metal-containing precursor compounds such as a noble metal salt and a noble-metal-containing acid are hydrolyzed in an aqueous medium and form hydroxyl group containing species which may then be deposited on carrier particles.

Particles made of doped or non-doped tin oxide having a BET surface area as specified above are commercially available or can be prepared by methods which are commonly known.

An exemplary process for preparing a metal-doped tin oxide is described below.

A metal-doped tin oxide (e.g. an antimony-doped tin oxide ATO) can be prepared by a process wherein a metal-doped precursor solid is prepared by a wet chemical synthesis from a reaction mixture comprising a tin-containing molecular precursor compound and a metal-dopant-containing molecular precursor compound, the metal-doped precursor solid is subjected to a thermal treatment.

Wet chemical synthesis methods for preparing inorganic solids, in particular fine-dispersed inorganic powders in aqueous and non-aqueous solvents, are known to the skilled person.

A wet chemical synthesis method that can be used is e.g. a sol-gel process, a chemical precipitation process, a hydrothermal synthesis process, a spray drying process, or any combination thereof.

Preferably, the reaction mixture comprising the tin-containing molecular precursor compound and the metal-dopant-containing molecular precursor compound is subjected to a chemical precipitation process or a sol-gel process.

For these wet chemical synthesis methods, appropriate reaction conditions such as pH and reaction temperature are known to the skilled person.

Just as an example, the tin-containing molecular precursor compound and the metal-dopant-containing molecular precursor compound can be mixed at acidic pH (exemplary acids: mineral acids such as HCl, carboxylic acids such as acetic acid), and the pH is subsequently raised by adding a base (e.g. an aqueous base such as aqueous ammonia) until the metal-doped precursor solid precipitates. The precipitated solid can be removed from the reaction mixture (e.g. by filtration) and subjected to a thermal treatment.

Appropriate solvents for carrying out a wet chemical synthesis are commonly known. In principle, a non-aqueous or an aqueous solvent can be used. Exemplary non-aquous solvents include alcohols, such as methanol, ethanol, propanol or butanol.

Typically, the tin-containing molecular precursor compound is a tin(IV) compound. However, it is also possible to use a tin(II) compound or a mixture of a tin(IV) compound and a tin(II) compound. The tin-containing molecular precursor compound can be a tin salt such as a tin halide (e.g. $SnCl_4$) or a tin nitrate, or a tin alkoxide or a mixture thereof.

The metal-dopant-containing molecular precursor compound can be e.g. a metal halide or a metal alkoxide or a mixture thereof.

If the metal dopant is Sb, the Sb-containing molecular precursor compound can be a Sb(III) compound (e.g. a Sb(III) halide, a Sb(III) carboxylate, or a Sb(III) alkoxide), a Sb(V) compound (e.g. a Sb(V) halide, a Sb(V) carboxylate, or a Sb(V) alkoxide), or a mixture thereof.

The wet chemical synthesis of the meta-doped tin oxide can be carried out in the presence of a solid additive having a BET surface area of at least 40 $m^2/g$.

The solid additive can be added to the reaction mixture before starting and/or while carrying out the wet chemical synthesis (e.g. the precipitation or sol-gel process).

A preferred solid additive is carbon, such as carbon black or activated carbon. As known to the skilled person, carbon black is manufactured by thermal decomposition or incomplete combustion of hydrocarbon compounds and is commercially available in different grades (which differ in BET surface area). Furthermore, as known to the skilled person, activated carbon is a porous carbon material which has been subjected to reaction with gases before, during or after carbonization in order to increase its adsorptive properties. Preferably, the solid additive has a BET surface area of at least 200 $m^2/g$, more preferably at least 500 $m^2/g$ or even at least 750 $m^2/g$; such as from 200 $m^2/g$ to 2500 $m^2/g$, more preferably from 500 $m^2/g$ to 2000 $m^2/g$, even more preferably from 750 $m^2/g$ to 1800 $m^2/g$. The solid additive can be micro- and/or mesoporous. However, it is also possible that the solid additive is non-porous as long as its BET surface area is at least 40 $m^2/g$.

Other additives that can be added to the reaction mixture before and/or during the wet chemical synthesis include e.g. surfactants, emulsifiers, dispersants, pH-modifiers, and/or amino acids (e.g. alanine).

The metal-doped tin oxide precursor solid obtained by the wet chemical synthesis is subjected to a thermal treatment. The thermal treatment can be carried out at a relatively low temperature just for removing residual solvent from the wet chemical synthesis. However, in a preferred embodiment, the thermal treatment includes heating to a temperature within the range of from 400 to 800° C., more preferably 500 to 700° C. If a solid additive such as carbon has been added to the reaction mixture, said solid additive can be burnt off or decomposed to gaseous decomposition products by a thermal treatment at relatively high temperature.

However, the metal-doped tin oxide to be coated with a noble metal oxide layer can be obtained by other preparation methods as well.

As indicated above, a noble-metal-containing precursor compound is dissolved in the aqueous medium so as to come into contact with the tin oxide particles.

Appropriate noble-metal-containing precursor compounds are e.g. a noble metal salt and a noble-metal-containing acid. Typically, the oxidation state of iridium and/or ruthenium in the noble-metal-containing precursor compound is +III or +IV. The salt of iridium or ruthenium is e.g. a halide salt, a chloro complex, a nitrate salt, or an acetate salt. A noble-metal-containing acid is e.g. $H_2IrCl_6$.

The concentration of the tin oxide particles in the aqueous medium can be varied over a broad range. Typically, the tin oxide particles are present in the aqueous medium at a concentration of from 0.05 to 50 wt %, more preferably from 0.1 to 20 wt %. The noble-metal-containing precursor compound is added in an amount which is sufficient for obtaining the desired iridium and ruthenium content in the final composition.

The pH of the aqueous medium is adjusted to to 5-10, more preferably 6-8; typically by adding an appropriate base such as an alkali metal hydroxide (e.g. KOH or NaOH).

As known to the skilled person, dissolved iridium or ruthenium salts or acids are hydrolyzed in an aqueous medium and form hydroxyl group containing species (e.g. in the form of colloidal, nanosized particles) by increasing pH. In the presence of carrier particles, iridium and/or ruthenium species (such as iridium oxyhydroxide or ruthenium oxyhydroxide) are deposited on said particles.

Optionally, deposition of the iridium and/or ruthenium species on the tin oxide particles can be promoted by heating the aqueous medium to a temperature of from 50° C. to 95° C., more preferably 60° C. to 90° C.

After deposition of the iridium and/or ruthenium species, the tin oxide particles are separated from the aqueous medium and subjected to a thermal treatment at a temperature of from 300° C. to 800° C., thereby forming the noble metal oxide layer on the tin oxide particles.

Typically, the thermal treatment is carried out in an oxidizing atmosphere, such as air. In principle, an inert atmosphere can also be used.

In a preferred embodiment, thermal treatment is carried out at a temperature of from 500° C. to 700° C., more preferably from 550° C. to 700° C.

For manufacturing electrodes or catalyst-coated membranes, the catalyst composition can be processed into inks or pastes by adding suitable solvents. The catalyst ink may be deposited onto gas diffusion layers (GDLs), current collectors, membranes, or separator plates by commonly known deposition processes.

The present invention also relates to an electrochemical device, containing the catalyst composition as described above.

The electrochemical device can be an electrolyzer, in particular a water electrolyser such as a PEM ("proton exchange membrane") water electrolyzer; or a fuel cell such as a PEM fuel cell. If the catalyst composition is present in a PEM fuel cell together with a carbon-supported catalyst, it can improve corrosion stability of said carbon support. It is also possible that the PEM fuel cell is a regenerative PEM fuel cell.

Like in any water electrolyser, at least one anode-containing half cell where the oxygen evolution reaction takes place, and at least one cathode-containing half cell where the hydrogen evolution reaction takes place, are present in the PEM water electrolyser of the present invention. The catalyst composition is present in the anode-containing half-cell.

According to a further aspect, the present invention relates to the use of the catalyst composition as described above as a catalyst for an oxygen evolution reaction (e.g. in an electrolyser or a regenerative fuel cell or other electrochemical devices).

The present invention will now be described in further detail by the following examples.

EXAMPLES

If not indicated otherwise, the parameters referred to in the present invention are determined according to the following measuring methods:

BET Surface Area

BET surface area was determined by gas adsorption analysis using Micromeritics ASAP 2420 Surface Area and Porosity Analyzer with $N_2$ adsorbate at 77.35 K. Prior to the measurement, samples were dried at 200° C. in vacuum overnight. The specific surface area was determined by BET theory using the multi-point method (ISO 9277:2010).

Electrical Conductivity

For measuring electrical conductivity, the oxide powders were pressed into pellets and the conductivity was determined at 25° C. by a 2 point probe method. First, 1 g of the powder samples were inserted into the Teflon tube with stainless steel bottom (electrode) of a measuring cell. After the filling is completed, a second stainless steel electrode was inserted on the top, and the filled test cell is inserted in between the pressure gauge. The pressure is increased to 40 MPa and the resistance is measured at said pressure via the 2 point method with an Agilent 3458A multimeter. From the measured resistance R (in Ohm), the electrical conductivity is calculated according to:

Conductivity=d/(R A)

d: distance of the 2 electrodes
R: measured resistance
A: electrode area (0.5 $cm^2$)

The resistance is the sum of the following contributions: electrode contact resistance, intragrain (bulk) resistance and intergrain resistance.

In the present invention, electrical conductivity is determined at a pressure of 40 MPa.

Amount of Iridium, Ruthenium, Tin and the Optional Metal Dopant

The amounts of iridium, ruthenium, metal dopant and tin are determined by elemental analysis according to the following method: 0.04 to 0.5 g of the sample is mixed with 10 g of a mixture of 84% $Li_2B_4O_7$, 1% LiBr and 15% $NaNO_3$. Using a Claisse Fluxer M4, a mixed pellet is formed. After cooling to room temperature, the elemental composition is determined using wavelength dispersive X-ray fluorescence.

Oxidation State of Iridium, Ruthenium and the Optional Metal Dopant; Relative Amounts of Ir(+IV) and Ru(+IV); Atomic Ratio of Sb(+V) to Sb(+III)

Oxidation states of iridium, ruthenium and the optional metal dopant (such as Sb) are determined by X-ray photoelectron spectroscopy (XPS). The relative amounts of iridium and ruthenium in oxidation state +IV, and the atomic ratio of Sb(+V) to Sb(+III) are also determined by XPS.

The XPS analysis was carried out with a Phi Versa Probe 5000 spectrometer using monochromatic Al Kα radiation (49 W) and Phi charge neutralizer system. The instrument work function was calibrated to give a binding energy (BE) of 84.00 eV for the Au 4f7/2 line of metallic gold and the spectrometer dispersion was adjusted to give a BE of 932.62 eV for the Cu 2p3/2 line of metallic copper. An analysis spot of 100×1400 µm² area was analyzed with a pass energy of 23.5 eV.

If the metal dopant is e.g. Sb, Sb 3d and O1 s spectra overlap and were analyzed using CasaXPS software version 2.3.17 using Shirley background subtraction in the energy region of 528-542.5 eV binding energy. Antimony contributions were fitted with three different components: Sb(III)-doublet at 529.7 and 539.1 eV, Sb(V)-doublet at 530.9 and 540.3 eV, Plasmons at 531.9 and 541.5 eV. Additionally, three oxygen contributions were used for fitting. Relative sensitivity factors as provided by the instrument manufacturer were used for quantification.

Iridium oxidation states were obtained from the Ir 4f signal with a doublet of asymmetric peaks (SGL(10)T(0.9)) for metallic iridium at 61.4 eV and 64.4 eV and an iridium oxide $IrO_2$ contribution fitted by a doublet of symmetric peaks 1.8 eV separated from the metallic peak.

The most intense ruthenium signal, Ru 3d typically overlaps with the Carbon 1 s-Signal. Aside from the carbon contributions in the range of 284.5 eV to 290.2 eV, doublets for Ru(0), $RuO_2$, hydrated $RuO_2$ and $RuO_3$ were used for the peak fit. All of these peaks show a high degree of asymmetry and were therefore described by a LF(0.6,1,200,900) peak shape in case of $RuO_3$ and $RuO_2$ or LF(0.25,1,45,280) in case of hydrated $RuO_2$. The relative signal positions and peak shapes are given in the attached table:

| Oxidation state | Binding energy of Ru 3d5/2 [eV] | Binding energy of Ru 3d3/2 [eV] | Peak shape |
| --- | --- | --- | --- |
| $RuO_3$ | 282.4 | 286.6 | LF(0.6, 1, 200, 900) |
| $RuO_2$ hydrated | 280.8 | 285.0 | LF(0.25, 1, 45, 280) |
| $RuO_2$ | 280.6 | 284.8 | LF(0.6, 1, 200, 900) |
| Ru | 280.1 | 284.3 | peak shape as obtained from the measurement of pure Ru metal |

Particle Morphology, Presence of a Noble Metal Oxide Layer on the Tin Oxide Particles The presence of an iridium oxide or iridium-ruthenium oxide layer which is at least partially coating the tin oxide particles was verified by scanning transmission electron microscopy combined with energy-dispersive X-ray spectroscopy ("EDXS mapping").

Inventive Example 1

In Inventive Example 1, the catalyst composition was prepared as follows:

Non-doped tin oxide powder was used as a support material to be coated by a noble metal oxide. The tin oxide powder had a BET surface area of 25 $m^2/g$.

2 g of the $SnO_2$ powder was dispersed in 400 g water, followed by adding 3.83 g of $IrCl_4$. Subsequently, the aqueous medium was heated to 80° C. and KOH was added until pH=7. From time to time, further KOH was added so as to keep the pH at about 7.

After stirring for about 1 hour, the aqueous medium was cooled to room temperature, the $SnO_2$ powder was separated from the aqueous medium by filtration, washed with water, and calcined in air at 600° C. for about 60 minutes.

The final catalyst composition had a BET surface area of 21 $m^2/g$, an electrical conductivity of 25 S/cm, and an iridium content of 25 wt %. All iridium was in oxidation state +IV.

FIGS. 1a and 1b show scanning transmission electron microscopy photographs with EDXS mapping. In FIG. 1a, EDXS is specifically detecting Sn, while Ir is specifically detected by EDXS in FIG. 1b. Both photographs show the same particles. As demonstrated by FIGS. 1a and 1b, tin (in the form of tin oxide) is present in the core of each particle, while iridium (in the form of iridium oxide) is present in the outer layer (shell) which is at least partially coating the tin oxide core.

Inventive Example 2

In Inventive Example 2, the catalyst composition was prepared as follows:

Antimony-doped tin oxide (ATO) powder was used as a support material to be coated by a noble metal oxide. The ATO powder had an Sb content of 5.7 wt % and a BET surface area of 56 $m^2/g$.

2 g of the ATO powder was dispersed in 400 g water, followed by adding 3.83 g of $IrCl_4$.

Subsequently, the aqueous medium was heated to 80° C. and KOH was added until pH=7. From time to time, further KOH was added so as to keep the pH at about 7.

After stirring for about 1 hour, the aqueous medium was cooled to room temperature, the ATO powder was separated from the aqueous medium by filtration, washed with water, and calcined in air at 600° C. for about 60 minutes.

The final catalyst composition had a BET surface area of 38 $m^2/g$, an electrical conductivity of >7 S/cm, and an iridium content of 33 wt %. All iridium was in oxidation state +IV.

Figures 2A, 2B:
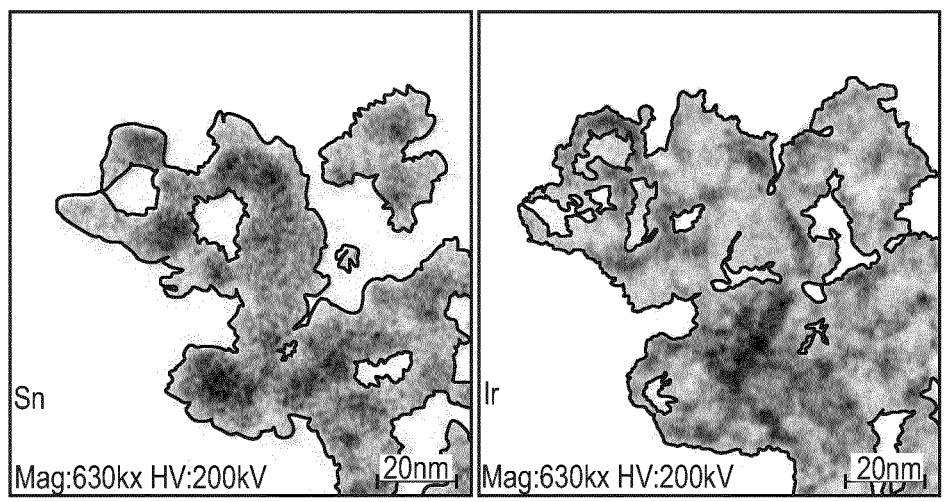
FIGS. 2a and 2b show scanning transmission electron microscopy photographs with EDXS mapping.

FIGS. 2a and 2b show scanning transmission electron microscopy photographs with EDXS mapping. In FIG. 2a, EDXS is specifically detecting Sn, while Ir is specifically detected by EDXS in FIG. 2b. Both photographs show the same particles. As demonstrated by FIGS. 2a and 2b, tin (in the form of antimony-doped tin oxide ATO) is present in the core of each particle, while iridium (in the form of iridium oxide) is present in the outer layer (shell) which is at least partially coating the ATO core.

Inventive Example 3

In Inventive Example 3, the catalyst composition was prepared as follows:

Antimony-doped tin oxide (ATO) powder was used as a support material to be coated by a noble metal oxide. The ATO powder had an Sb content of 5.5 wt % and a BET surface area of 87 $m^2/g$.

1.4 g of the ATO powder was dispersed in 280 g water, followed by adding 2.68 g of $IrCl_4$. Subsequently, the aqueous medium was heated to 80° C. and KOH was added until pH=7. From time to time, further KOH was added so as to keep the pH at about 7.

After stirring for about 1 hour, the aqueous medium was cooled to room temperature, the ATO powder was separated from the aqueous medium by filtration, washed with water, and calcined in air at 600° C. for about 60 minutes.

The final catalyst composition had an electrical conductivity of >7 S/cm, and an iridium content of 24 wt %. All iridium was in oxidation state +IV. The tin oxide particles (representing the core) are at least partially coated by an iridium oxide layer (representing the shell).

Inventive Example 4

In Inventive Example 4, the catalyst composition was prepared as follows:

Antimony-doped tin oxide (ATO) powder was used as a support material to be coated by a noble metal oxide. The ATO powder had an Sb content of 11.8 wt % and a BET surface area of 95 $m^2/g$.

2.5 g of the ATO powder was dispersed in 125 g water, followed by adding 1.61 g of $IrCl_4$. Subsequently, the aqueous medium was heated to 80° C. and KOH was added until pH=7. From time to time, further KOH was added so as to keep the pH at about 7.

After stirring for about 1 hour, the aqueous medium was cooled to room temperature, the ATO powder was separated from the aqueous medium by filtration, washed with water, and calcined in air at 600° C. for about 60 minutes.

The final catalyst composition had an electrical conductivity of >7 S/cm, a BET surface area of 83 $m^2/g$, and an iridium content of 17 wt %. All iridium was in oxidation state +IV. The tin oxide particles (representing the core) are at least partially coated by an iridium oxide layer (representing the shell).

Inventive Example 5

In Inventive Example 5, the catalyst composition was prepared as follows:

Antimony-doped tin oxide (ATO) powder was used as a support material to be coated by a noble metal oxide. The ATO powder had an Sb content of 5.48 wt % and a BET surface area of 71 $m^2/g$.

6 g of the ATO powder was dispersed in 1200 g water, followed by adding 11.5 g $IrCl_4$. Subsequently, the aqueous medium was heated to 80° C. and KOH was added until pH=7. From time to time, further KOH was added so as to keep the pH at about 7.

After stirring for about 1 hour, the aqueous medium was cooled to room temperature, the ATO powder was separated from the aqueous medium by filtration, washed with water, and calcined in air at 600° C. for about 60 minutes.

The final catalyst composition had an electrical conductivity of 18 S/cm, a BET surface area of 52 $m^2/g$, and an iridium content of 38 wt %. All iridium was in oxidation state +IV. The tin oxide particles (representing the core) are at least partially coated by an iridium oxide layer (representing the shell).

Testing the Electrochemical Performance and Corrosion Stability

The catalyst compositions of Inventive Examples 1 to 5 were tested for their electrochemical performance and corrosion stability under highly corrosive conditions.

For comparative purposes, the following samples were tested as well:

Comparative Example 1

Non-supported metallic iridium black powder, BET surface area: 60 $m^2/g$.

Comparative Example 2

Non-supported iridium(IV) oxide powder; BET surface area: 25 m2/g.

Inks were prepared with all samples (i.e. the samples of Inventive Examples 1 to 5 and Comparative Examples 1-2) by dispersing the appropriate amount of catalyst composition powder in a solution of water, isopropanol and Nafion (binder), to achieve a total catalyst concentration of 6 µg/L. Inks were cast onto gold foil current collectors to get an electrode loading of 120 $\mu g_{cat}/cm^2$ (geometric surface area). The catalyst compositions were tested in a 0.5 M $H_2SO_4$ electrolyte. A conditioning step was performed by cycling the potential in a non OER region for 50 cycles. Linear sweep voltammograms were subsequently recorded at 1 mV/s. After 3 consecutive LSVs, a chronoamperometry step at 2 V vs. RHE was applied for 20 hours, in order to submit the catalyst composition to a "stress test". Afterwards, electrolytes were collected after the electrochemical characterization and analyzed by inductively coupled plasma mass spectroscopy (ICP-MS) to determine if any iridium traces were present due to dissolution.

For evaluating catalytic activity, mass normalized current densities j [$A/g_{Ir}$] at 1.9 V vs. RHE were determined.

The results are summarized in Table 1.

TABLE 1

Results of electrochemical and corrosion stability tests

| Sample | $j/A\ g_{Ir}^{-1}$ @ 1.9 vs. RHE | Ir content in electrolyte (ppm) |
|---|---|---|
| IE-1 | 1544.4 | <0.1 |
| IE-2 | 1939.4 | <0.1 |
| IE-3 | 2062.9 | <0.1 |
| IE-4 | 1464.2 | <0.1 |
| IE-5 | 1499.1 | <0.1 |
| CE-1 | 1345.7 | 4 |
| CE-2 | 633.8 | <0.1 |

All Inventive Examples show high activities (mass normalized current densities), demonstrating a very efficient utilization of the iridium active centers. Furthermore, as indicated by a negligible content of dissolved iridium in the surrounding electrolyte, the Inventive Examples show very high corrosion stability.

When using a catalyst composition based on metallic iridium powder (Comparative Example 1), high activity can be achieved. However, corrosion stability is adversely affected.

When using a catalyst composition based on non-supported $IrO_2$ powder (CE 2), activity is significantly lower.

Accordingly, the Inventive Examples show an improved balance between catalytic activity and corrosion stability.

The invention claimed is:

1. A catalyst composition, comprising tin oxide particles, wherein the tin oxide is optionally doped with at least one metal dopant, each tin oxide particles is coated by a noble metal oxide layer, wherein the noble metal oxide is iridium oxide or iridium-ruthenium oxide,
wherein the composition
contains iridium and ruthenium in a total amount of from 10 wt % to 38 wt %, and all iridium and ruthenium is oxidized,
has a BET surface area of from 5 to 95 $m^2/g$, and
has an electrical conductivity at 25° C. of at least 7 S/cm.

2. The catalyst composition according to claim 1, wherein the tin oxide is a non-doped tin oxide; or wherein the tin oxide is doped with at least one metal dopant selected from Sb, Nb, Ta, Bi, W, or In, or any combination of at least two of these dopants, the one or more metal dopants being present in the tin oxide in an amount of from 2.5 at % to 20 at % based on the total amount of tin and metal dopant atoms.

3. The catalyst composition according to claim 1, wherein the tin oxide is a non-doped tin oxide; or wherein the tin oxide is doped with at least one metal dopant selected from Sb, Nb, Ta, Bi, W, or In, or any combination of at least two of these dopants, the one or more metal dopants being present in the tin oxide in an amount of from 2.5 at % to 10.0 at %, based on the total amount of tin and metal dopant atoms.

4. The catalyst composition according to claim 1, wherein the total amount of iridium and ruthenium in the catalyst composition is from 15 to 35 wt %.

5. The catalyst composition according to claim 1, wherein the total amount of iridium and ruthenium in the catalyst composition is from 20 to 28 wt %.

6. The catalyst composition according to claim 1, wherein all iridium and ruthenium being present in the catalyst composition is in oxidation state +III and/or +IV.

7. The catalyst composition according to claim 1, having a BET surface area of from 5 $m^2/g$ to 90 $m^2/g$.

8. The catalyst composition according to claim 1, having an electrical conductivity of at least 10 S/cm.

9. The catalyst composition according to claim 1, having a BET surface area of from 10 $m^2/g$ to 80 $m^2/g$ and having an electrical conductivity of at least 12 S/cm.

10. The catalyst composition according to claim 1, wherein the tin oxide is a non-doped tin oxide; the amount of iridium in the composition is within the range of from 15 to 35 wt %, the remainder being the tin oxide particles and the oxygen of the iridium oxide layer; the BET surface area of the composition is from 5 $m^2/g$ to 35 $m^2/g$; and the electrical conductivity of the composition is from 10 to 50 S/cm.

11. The catalyst composition according to claim 1, wherein the tin oxide is a non-doped tin oxide; the amount of iridium in the composition is within the range of from 20 to 28 wt %, the remainder being the tin oxide particles and the oxygen of the iridium oxide layer; the BET surface area of the composition is from 5 $m^2/g$ to 35 $m^2/g$; and the electrical conductivity of the composition is from 12 to 40 S/cm.

12. The catalyst composition according to claim 1, wherein the tin oxide is doped with antimony in an amount of from 2.5 at % to 20 at %, the amount of iridium in the composition is within the range of from 15 to 35 wt %, the remainder being the tin oxide particles and the oxygen of the iridium oxide layer; the BET surface area of the composition is from 15 $m^2/g$ to 90 $m^2/g$; and the electrical conductivity of the composition is from 10 to 50 S/cm.

13. The catalyst composition according to claim 1, wherein the tin oxide is doped with antimony in an amount of from 2.5 at % to 10.0 at %; the amount of iridium in the composition is within the range of from 20 to 28 wt %, the remainder being the tin oxide particles and the oxygen of the iridium oxide layer; the BET surface area of the composition is from 30 $m^2/g$ to 80 $m^2/g$; and the electrical conductivity of the composition is from 12 to 40 S/cm.

14. A process for preparing the catalyst composition according to claim 1, which comprises
dispersing tin oxide particles and dissolving a noble-metal-containing precursor compound in an aqueous medium, wherein the noble metal is iridium or ruthenium or a mixture thereof,
adjusting pH of the aqueous medium to 5-10 and optionally heating the aqueous medium to a temperature of from 50° C. to 95° C., thereby depositing noble metal species on the tin oxide particles, separating the tin oxide particles from the aqueous medium and subjecting the tin oxide particles to a thermal treatment at a temperature of from 300° C. to 800° C., thereby forming a noble metal oxide layer on the tin oxide particles.

15. The process according to claim 14, wherein the tin oxide particles dispersed in the aqueous medium have a BET surface area of from 10 to 100 m$^2$/g.

16. The process according to claim 14, wherein the noble-metal-containing precursor compound is a noble metal salt or a noble-metal-containing acid.

17. The process according to claim 14, wherein the thermal treatment is carried out at a temperature of from 500° C. to 700° C.

18. An electrochemical device, comprising the catalyst composition according to claim 1.

19. The electrochemical device according to claim 18, which is a water electrolyser or a fuel cell.

20. A catalyst for an oxygen evolution reaction which comprises the catalyst composition according to claim 1.

21. The process according to claim 14, wherein the thermal treatment is carried out at a temperature of from 600° C. to 800° C.

* * * * *